US012565167B2

(12) United States Patent
Roberts et al.

(10) Patent No.: US 12,565,167 B2
(45) Date of Patent: Mar. 3, 2026

(54) SYSTEMS FOR INCREASING AIRFLOW PAST A VEHICLE ENERGY ABSORBER

(71) Applicant: Toyota Motor Engineering & Manufacturing North America, Inc., Plano, TX (US)

(72) Inventors: Shawn Roberts, Ypsilanti, MI (US); David N. Evans, Ypsilanti, MI (US); Robert Cooper, Garden City, MI (US); Yan Liu, Canton, MI (US); Brandon Hanna, Dexter, MI (US); Troy Grantham, Saline, MI (US); Mingher Fred Shen, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 416 days.

(21) Appl. No.: 18/352,508

(22) Filed: Jul. 14, 2023

(65) Prior Publication Data

US 2025/0018890 A1    Jan. 16, 2025

(51) Int. Cl.
B60R 19/02 (2006.01)
B60R 19/03 (2006.01)
B60R 19/04 (2006.01)

(52) U.S. Cl.
CPC ............ B60R 19/023 (2013.01); B60R 19/03 (2013.01); B60R 19/04 (2013.01)

(58) Field of Classification Search
None
See application file for complete search history.

(56) References Cited

U.S. PATENT DOCUMENTS

| | | | | |
|---|---|---|---|---|
| 3,938,841 | A * | 2/1976 | Glance ................... | B60R 19/18 267/116 |
| 6,082,792 | A * | 7/2000 | Evans .................... | B60R 19/18 293/133 |
| 6,866,313 | B2 * | 3/2005 | Mooijman .............. | B60R 19/18 293/121 |
| 6,908,127 | B2 | 6/2005 | Evans | |
| 6,938,936 | B2 * | 9/2005 | Mooijman .............. | F16F 7/121 293/133 |
| 7,044,514 | B2 * | 5/2006 | Mustafa .................. | B60R 19/22 293/109 |
| 7,399,014 | B2 | 7/2008 | Mellis et al. | |
| 7,681,700 | B2 | 3/2010 | Ginja et al. | |
| 8,016,331 | B2 * | 9/2011 | Ralston .................. | B60R 19/18 293/121 |
| 8,408,632 | B2 | 4/2013 | Shimotsu et al. | |
| 8,840,819 | B2 * | 9/2014 | Roberts, Jr. .............. | B32B 5/20 264/45.2 |

(Continued)

*Primary Examiner* — Amy R Weisberg
*Assistant Examiner* — Veronica M Condo
(74) *Attorney, Agent, or Firm* — Christopher G. Darrow; Darrow Mustafa PC

(57) ABSTRACT

Systems and other embodiments described herein relate to vehicle collision energy absorption with increased airflow towards an engine compartment of a vehicle. In one embodiment, the system includes a front energy absorber with a first top surface having an angle and a rear energy absorber with a second top surface that is curved. The rear energy absorber is separated from the front energy absorber by a gap and a plane of the first top surface is tangential to the second top surface.

10 Claims, 6 Drawing Sheets

(56)                    References Cited

U.S. PATENT DOCUMENTS

|  |  |  |  |  |
|---|---|---|---|---|
| 8,973,957 | B2 | 3/2015 | Corwin et al. | |
| 9,731,669 | B2 * | 8/2017 | Nagwanshi | B60R 19/18 |
| 10,618,486 | B2 * | 4/2020 | Faruque | B60R 19/03 |
| 11,046,269 | B2 * | 6/2021 | Rangel | B60R 19/023 |
| 11,505,148 | B2 * | 11/2022 | Carrillo Fernandez | |
|  |  |  |  | B60R 19/12 |
| 12,097,902 | B2 * | 9/2024 | Watanabe | B60R 19/18 |
| 2009/0200811 | A1 * | 8/2009 | Erzgraber | B60R 19/18 |
|  |  |  |  | 293/120 |
| 2012/0291941 | A1 * | 11/2012 | Czopek | B29C 66/1122 |
|  |  |  |  | 156/189 |
| 2016/0207482 | A1 * | 7/2016 | Tachibana | B60R 19/18 |

* cited by examiner

SYSTEMS FOR INCREASING AIRFLOW PAST A VEHICLE ENERGY ABSORBER

TECHNICAL FIELD

The subject matter described herein relates, in general, to vehicle energy absorbers and, more particularly, to a vehicle energy absorption system with increased airflow towards engine components of the vehicle.

BACKGROUND

Vehicles are equipped with bumpers at the front and rear surfaces to at least partially absorb an impact resulting from a collision. The impact absorption protects the vehicle, passengers within the vehicle, and any pedestrians that may be involved in the collision. When first developed, the bumper of a vehicle comprised a metal beam attached to the frame of the vehicle. During collisions, these bumpers transferred the energy from the collision into the vehicle. This resulted in damage to the vehicle and potential injury to passengers within the car. In the case of a pedestrian-vehicle collision, the metal bumper also posed an injury risk to the pedestrian.

As a result, energy absorbers were developed that reduced collision-based vehicle damage and user injury. An energy absorber is a vehicle system attached to a vehicle's front or rear bumper and covered with a vehicle's body fascia. The energy absorber dissipates impact energy resulting from a collision of the vehicle with another vehicle or a pedestrian. That is, the energy absorbers collapse or crush upon impact, thus absorbing the energy resulting from minor collisions. As such, the energy absorbers reduce the energy transferred to the vehicle frame and passengers within the vehicle. The energy absorber collapse also reduces the impact force on a pedestrian in a pedestrian-vehicle collision.

SUMMARY

In one embodiment, example systems and methods relate to a manner of improving airflow over and around the vehicle energy absorption system.

In one embodiment, a vehicle energy absorption system for increased airflow to an engine compartment of a vehicle is disclosed. The vehicle energy absorption system includes a front energy absorber with a first top surface having an angle. The vehicle energy absorption system also includes a rear energy absorber with a second top surface that is curved. The rear energy absorber is separated from the front energy absorber by a gap. A plane of the first top surface is tangential to the second top surface.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
FIG. 1 illustrates one embodiment of a vehicle within which systems disclosed herein may be implemented.

Systems and other embodiments associated with improving airflow to an engine compartment of a vehicle are disclosed herein. As previously described, energy absorbers are damage-preventing components that are attached to vehicle frames. Upon contact with another vehicle, or a pedestrian, the energy absorber collapses to absorb the energy of the collision. As a result, the energy absorber reduces the damage to a vehicle and reduces the severity of or prevents injury to the occupants of the vehicle and other individuals involved in the collision.

While energy absorbers have undoubtedly reduced vehicular damage and increased pedestrian/passenger safety during minor collisions, improvements to energy absorption systems in a vehicle may further improve the operational and safety characteristics of the vehicle. For example, energy absorption systems impede airflow into the engine compartment of a vehicle. That is, air cools or is otherwise used by engine components in a vehicle engine compartment. As one particular example, a radiator relies on cooling airflow to draw heat away from the engine to ensure a long and effective operating life of the engine. Certain energy absorption systems block this air from reaching the engine compartment or reduce the amount of air that reaches the engine compartment. For example, some energy absorption systems include flat front surfaces or steeply angled front surfaces that direct the air upwards and perpendicular to a direction that would lead the air to the engine compartment. This vertical air movement generates vortices that reduce the airflow into the engine compartment. That is, airflow over a trailing edge of an energy absorber is turbulent and not laminar. This results in less air being directed toward the engine compartment for cooling. As such, the engine components that rely on airflow for cooling or other purposes have reduced operational efficiency and potentially reduced life.

As such, the present specification describes an energy absorption system that improves the airflow to the engine compartment. Specifically, the energy absorber has a specific shape that reduces air vortices in airflow around the energy absorber. The energy absorption system of the present specification includes two pieces that are separated from one another. Doing so increases the impact energy absorption capabilities of the energy absorber. That is, a two-component energy absorber, with a gap between the different components has a higher energy absorption capacity, thus reducing the amount of impact transferred to the vehicles and/or pedestrians involved in a vehicle collision. In an example, the front energy absorber also includes ribs along the back to further increase the energy absorber's strength, reduce vehicular damage, and improve pedestrian safety.

To increase airflow, the front energy absorber has an angled top surface that is tangential to a top curved surface of the rear energy absorber. In so doing, airflow is directed more smoothly over the energy absorber, rather than being abruptly directed upward. This reduces the formation of vortices in an air stream. Despite the gap between the two energy absorbers, the energy absorption system achieves the laminar flow. That is, the gap between the energy absorbers is small enough that it does not generate vortices in the airstream, nor does it interrupt the smooth flow of air over the energy absorbers. The vortex-reducing arrangement of the two energy absorbers increases the airflow toward the engine compartment of the vehicle.

In this way, the disclosed systems and other embodiments improve pedestrian safety via a two-piece energy absorption system and improve airflow to the engine compartment that sits behind the energy absorption system in an airflow direction by aligning the energy absorbers of the system in a particular arrangement where vortex formation at a trailing edge of the energy absorbers is reduced. Computational fluid dynamics (CFD) tests indicate that the energy absorption system of the present specification increases airflow to the radiators by approximately 17% at high speeds.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle includes an energy absorption system that is implemented to perform methods and other functions as disclosed herein relating to improving airflow to an engine compartment of the vehicle.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that benefits from the functionality discussed herein associated with energy absorbers that increase airflow to other areas of the vehicle 100, reduce vehicle 100 damage, and increase safety to any users within the vehicle 100 or otherwise involved in a collision with the vehicle 100.

In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode. In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100. Furthermore, the vehicle 100 includes, in various arrangements, one or more vehicle systems. For example, the vehicle 100 includes a propulsion system, a braking system, a steering system, a throttle system, a transmission system, a signaling system, and a navigation system.

The vehicle 100 includes a frame that provides a structural foundation for the vehicle 100. Vehicle components are attached to the frame. The vehicle energy absorption system is installed on the front and/or rear portions of the frame. As described above, without the front and/or rear energy absorption systems, the energy of a collision is transferred directly to the frame and the passengers of the vehicle 100. As such, a front energy absorption system prevents damage to the front end of the vehicle 100 in a collision, while a rear energy absorption system prevents damage to the rear end of the vehicle 100 in a collision. In either case, the energy absorption system is covered by the fascia of the vehicle body. Specifically, a front energy absorption system is covered by a front fascia 105 of the vehicle body, while a rear energy absorption system is covered by a rear fascia 110.

Figure 2:
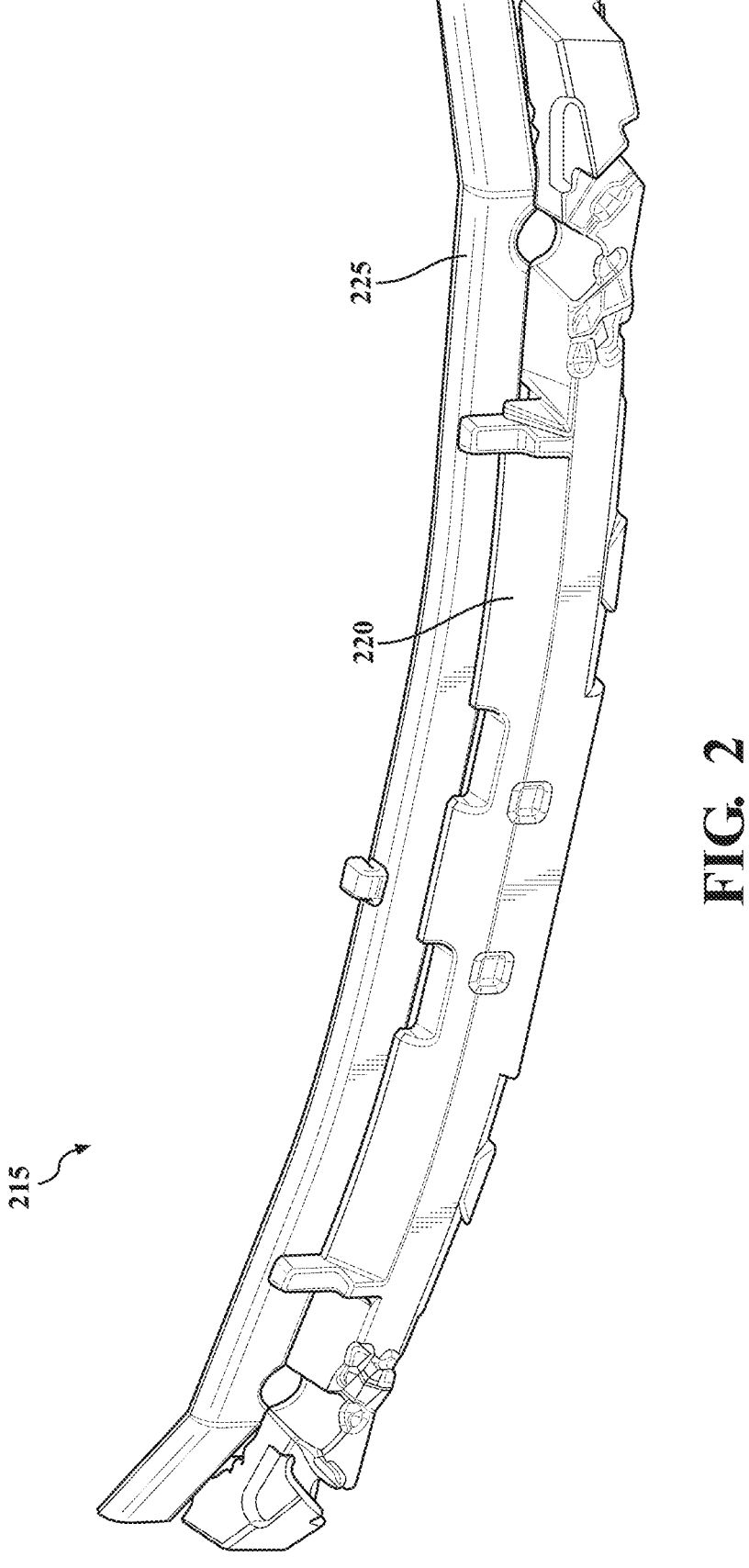
FIG. 2 illustrates a front isometric view of an energy absorption system with increased airflow.

FIG. 2 illustrates a front isometric view of an energy absorption system 215 with increased airflow. Specifically, the energy absorption system 215 includes a front energy absorber 220 and a rear energy absorber 225. As depicted below in connection with FIG. 6, a gap separates the front energy absorber 220 from the rear energy absorber 225. Separating the absorbers in this fashion increases pedestrian safety in a pedestrian-vehicle accident. That is, a two-piece energy absorption system 215 can absorb more energy than a one-piece energy absorption system. Therefore, the present energy absorption system 215 reduces the amount of energy transferred to the vehicle and the other object (e.g., pedestrian or vehicle) involved in a collision.

To further increase the amount of energy absorbed, the energy absorbers 220, 225 may be formed of different materials. Different materials have different properties which alter their ability to absorb energy. As such, energy absorbers 220, 225 formed of different materials have different stiffnesses. In a specific example, the rear energy absorber 225 is formed of a material that is stiffer than the front energy absorber 220. As such, the front energy absorber 220 deforms or collapses at a lower impact energy relative to the rear energy absorber 225. In this example, the front energy absorber 220 may absorb impact energy up to a certain value, after which point the impact energy would be absorbed by a combination of the front energy absorber 220 and the rear energy absorber 225. As such, a dual-material energy absorption system 215 has a broader energy absorption range than a one-piece system. In the two-material system, a less stiff front energy absorber 220 absorbs impact energies below a threshold value, and before a rear energy absorber 225 begins to absorb impact energy. The front energy absorber 220 and the rear energy absorber 225 may be formed from various materials, including polypropylene foam, polyurethane foam, polystyrene foam, or the like. While particular reference is made to foam-based energy absorbers 220, 225, the energy absorbers 220, 225 may be formed of different materials, such as non-foam-based materials.

As described above, the front energy absorber 220 and the rear energy absorber 225 may be formed of different materials. In the example where the energy absorbers 220, 225 are formed of foam, this may mean that the front energy absorber 220 and the rear energy absorber 225 are formed of different foams or formed of the same foam but with different properties. For example, the front energy absorber 220 may be formed of one type of foam while the rear energy absorber 225 is formed of another type of foam.

In another example, the rear energy absorber 225 and the front energy absorber 220 are formed of the same foam, but having different densities. Specifically, the rear energy absorber 225 may have a first density and the front energy absorber 220 may have a second density that is less than the first density. The stiffness of a foam is defined by its density, with a greater density providing greater stiffness. As such, the rear energy absorber 225, being formed of more dense foam, is stiffer. For example, the rear energy absorber 225 may be formed of a foam with a density of 4.5-5.5 pounds per cubic foot (p.c.f), while the front energy absorber 220 may be formed of a foam with a density of 2.0-3.0 p.c.f. Given that the front energy absorber 220 is less dense and therefore less stiff, the front energy absorber 220 collapses from a lower impact energy relative to the rear energy absorber 225 which is more stiff. As such, the present structure provides a variable-force energy absorption system 215.

Not only does the present energy absorption system 215 increase pedestrian/passenger safety, but it also promotes increased airflow to vehicle components found within the engine compartment. As described above, certain components of the vehicle 100 rely on air to perform their intended function. For example, a radiator uses airflow to draw heat out of engine components. These components may reside behind the energy absorption system 215. If not properly constructed, energy-absorbing components block airflow to components such as the radiator and others and reduce their efficacy. As such, the energy absorption system 215 of the present specification is configured in such a way as to promote increased airflow.

Specifically, the front energy absorber 220 has a first top surface that is angled and the second energy absorber 225 has a top surface that is curved. A plane of the first top surface is tangential to the second top surface. As such, airflow across the top surface of the front energy absorber 220 is not re-directed by the rear energy absorber 225, but rather continues uninterrupted across the rear energy absorber 225. By comparison, previous energy absorption systems have a profile that has a non-uniform top surface. That is, the air changes direction as it flows over the energy absorber. In some cases, the air is re-directed perpendicular to a vehicle length direction. The re-direction of air over the energy absorber, in particular to a vertical direction, produces vortices at the tail end of the energy absorber. The vortices have the effect of reducing airflow to the engine compartment. Accordingly, by aligning the front energy absorber 220 top surface with the curvature of the rear energy absorber 225, the air is not re-directed upward. Instead, the air maintains laminar flow over the entirety of the energy absorption system 215 in a generally parallel direction to the vehicle length direction. Thus the quantity of airflow over the energy absorption system 215 and into the engine compartment is increased.

As the energy absorption system 215 provides increased airflow, the engine components may run more efficiently. That is, more air is provided to the engine components such that their proper operation is ensured. Additional detail regarding airflow across the energy absorption system 215 is provided below in connection with FIG. 6.

Figure 3:
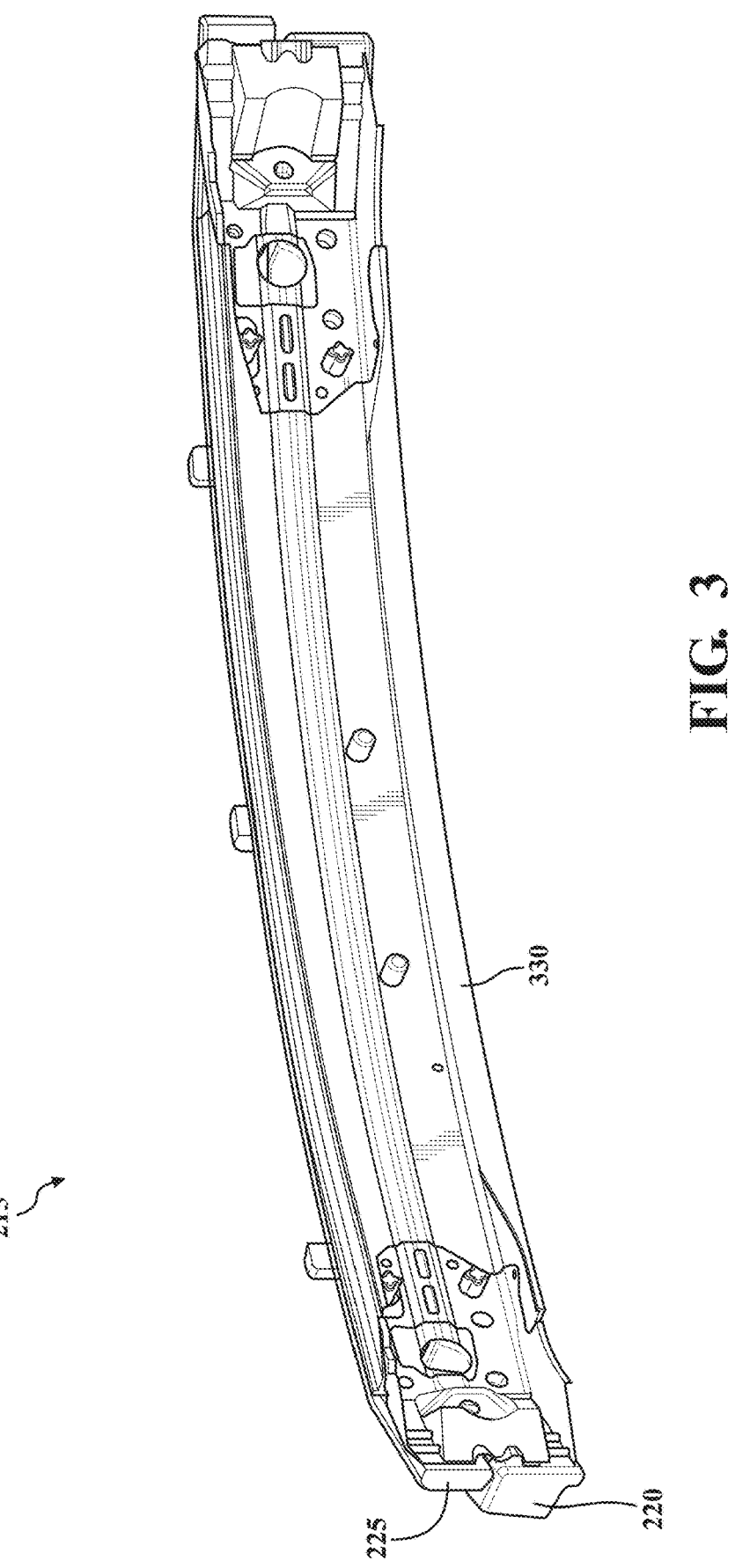
FIG. 3 illustrates a rear isometric view of an energy absorption system with increased airflow.

FIG. 3 illustrates a rear isometric view of the energy absorption system 215 with increased airflow. Specifically, FIG. 3 depicts the rear view of the front energy absorber 220 and the rear energy absorber 225. As described above, both components are attached to a frame member 330 of the vehicle 100. Specifically, the rear energy absorber 225 and the front energy absorber 220 are individually attachable to the frame member 330 of the vehicle 100. That is to say that the rear energy absorber 225 and the front energy absorber 220 are separate components that are not attached to one another. The energy absorbers 220, 225 may be attached to the frame member 330 in many ways, including screws, bolts, or any other type of attachment mechanism. As described above, the front energy absorber 220 and the rear energy absorber 225 may be affixed to either a front frame member 330 or a rear frame member 330.

Figure 4:
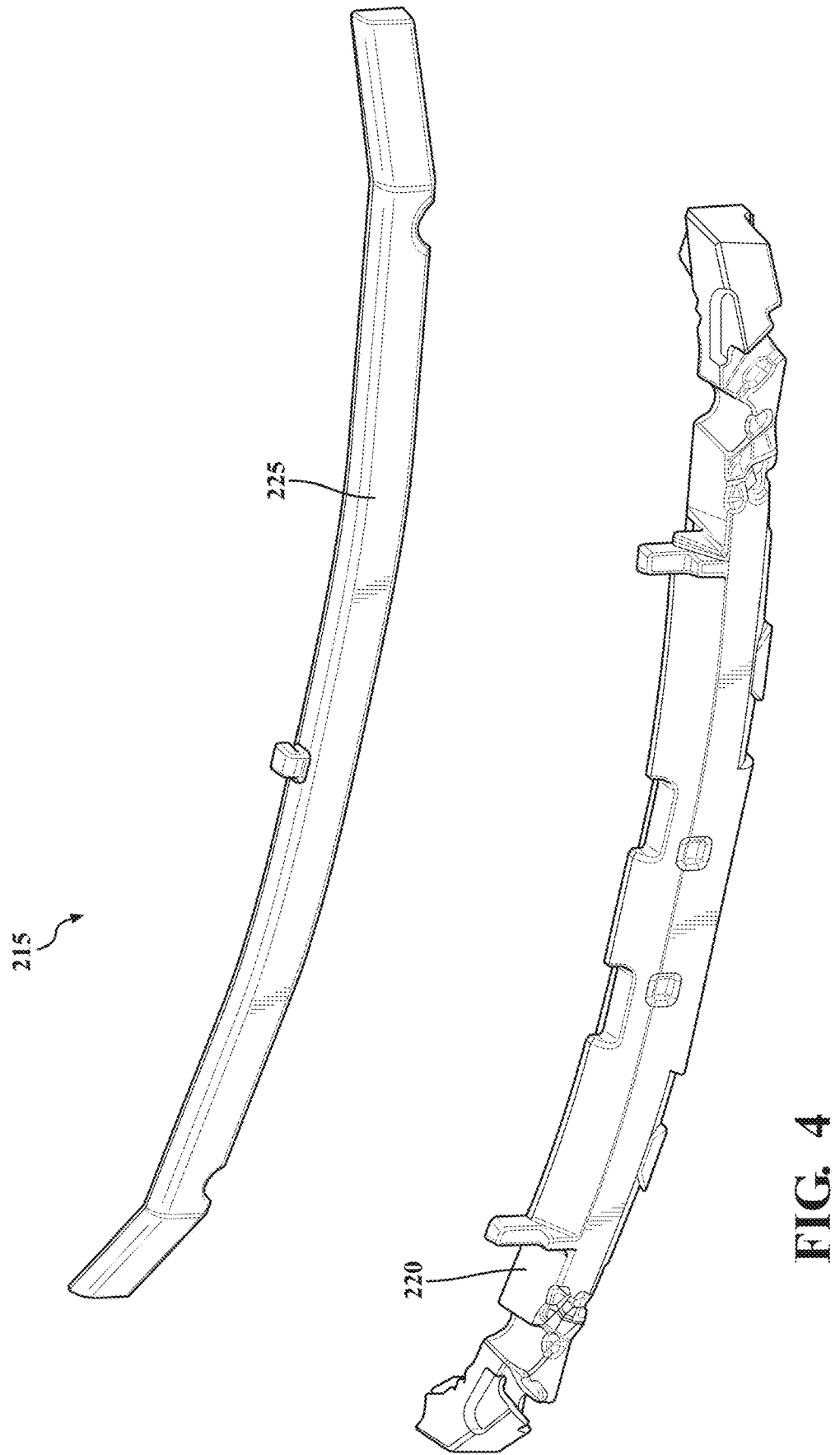
FIG. 4 illustrates a front exploded view of an energy absorption system with increased airflow.
Figure 5:
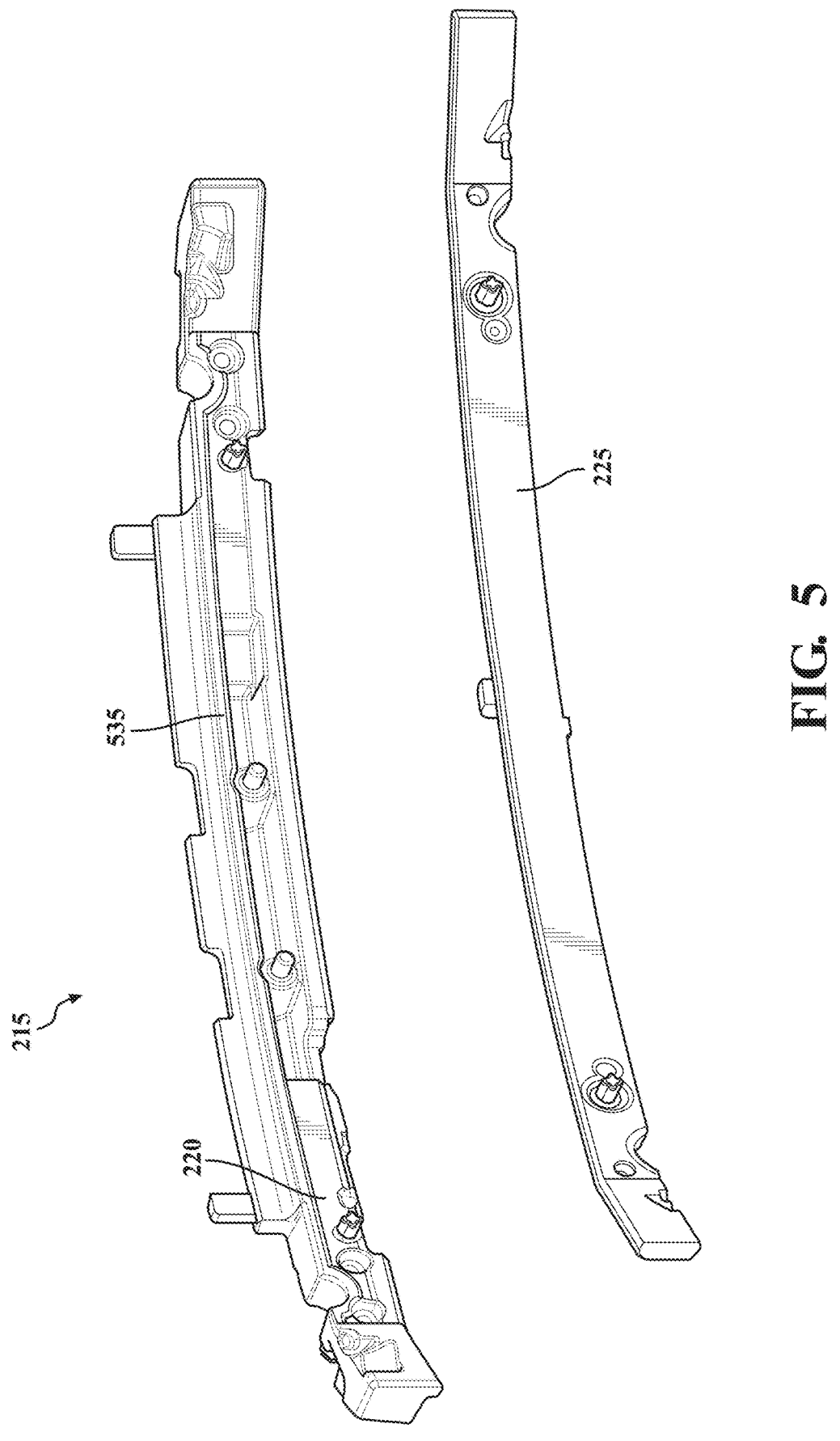
FIG. 5 illustrates a rear exploded view of an energy absorption system with increased airflow.

FIG. 4 illustrates a front-exploded view of an energy absorption system 215 with increased airflow and FIG. 5 illustrates a rear-exploded view of the energy absorption system 215. FIG. 5 specifically depicts additional components of the energy absorption system 215. Specifically, in an example, the back surface of the front energy absorber 220 includes a rib 535 which further increases the stiffness of the front energy absorber 220. The rib 535 provides additional stiffness to the front energy absorber 220 to increase the rigidity/stiffness of the front energy absorber 220. Any increase to the stiffness of the energy absorber increases its ability to absorb energy and reduce the energy that is ultimately transmitted to either the vehicle 100 or another person/object involved in the collision. As such, the rib 535 further increases pedestrian/passenger safety while reducing vehicle damage from a collision. As depicted in FIG. 5, the rib 535 is transverse to the vehicle length direction.

Figure 6:
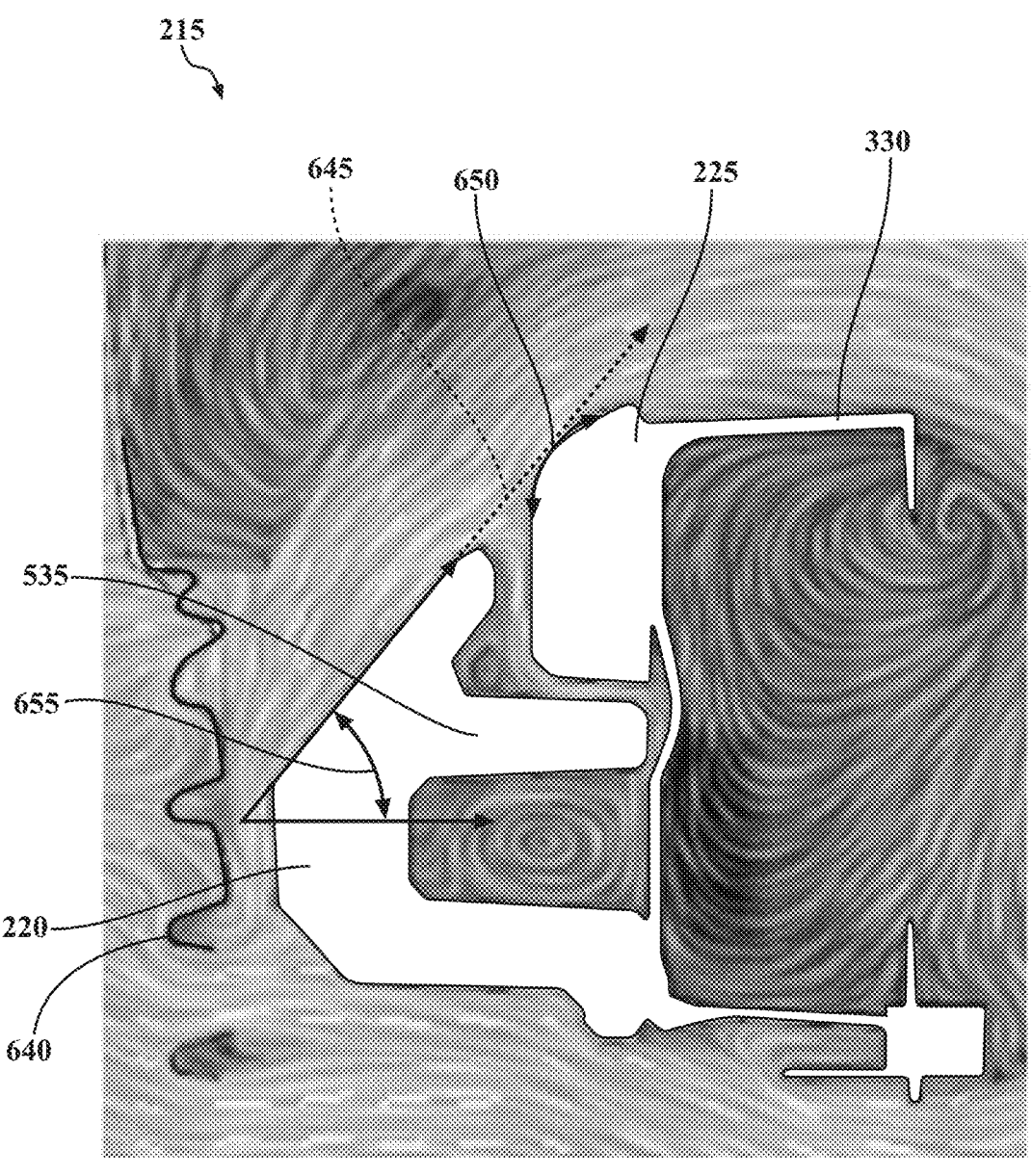
FIG. 6 is a cross-sectional view of an energy absorption system with increased airflow.

FIG. 6 is a cross-sectional view of the energy absorption system 215 with increased airflow. FIG. 6 clearly depicts the front energy absorber 220 and the rear energy absorber 225. FIG. 6 specifically depicts the energy absorption system 215 mounted to a front frame member 330 of the vehicle 100. As depicted in FIG. 6, the energy absorption system 215 is disposed behind a grill 640 of the vehicle 100 with a gap between the grill and the front energy absorber 220. This gap increases the airflow around the energy absorption system 215.

FIG. 6 also depicts the top surface of the front energy absorber 220 which is angled, and the top surface of the rear energy absorber 225 which is curved. As described above and as clearly depicted in FIG. 6, a plane 645 of the first top surface of the front energy absorber 220 is tangential with the curved surface 650 of the rear energy absorber 225. That is, an angle 655 of the front energy absorber is tangential with the curved surface 650 of the rear energy absorber. Doing so allows the air, represented by the arrows, to laminarly flow over the rear energy absorber 225 rather than being directed upward in a vertical direction. This vertical airflow generates turbulence and vortexes, reducing airflow to the engine compartment. As such, air that flows over the top surface of the energy absorption system 215 is not re-directed upwards away from the engine compartment. Instead, the airflow is directed toward the engine compartment, as indicated by the arrows in FIG. 6, to be used by engine compartment components.

Turbulence is further generated as air flows over abrupt changes to a surface area. As such, the presence of vortices and turbulence is further reduced by incorporating a rear energy absorber 225 with a curved surface rather than a sharply angled surface. This curved surface, therefore, contributes to the laminar rather than turbulent flow of air across the energy absorption system 215.

In an example, the front energy absorber 220 further includes a vertical front surface and a downward-sloping bottom surface. As such, the front energy absorber 220 has a convex profile in a vehicle length direction. This generates laminar flow around the bottom of the energy absorption system 215 to match the laminar flow around the top of the energy absorption system 215.

As depicted in FIG. 6, the front energy absorber 220 may extend below and in front of the rear energy absorber in a vehicle length direction. Given the convex shape of the front energy absorber 220, rather than impinging upon a flat surface, air impinges upon a sloped surface and is aerodynamically directed towards the engine compartment around the energy absorbers 220, 225. As such, the present energy absorption system 215 1) increases pedestrian safety by way of the two-piece construction and 2) increases airflow by way of aligning the top surfaces of the two absorbers.

As described above, a gap separates the rear energy absorber 225 from the front energy absorber 220. In an example, the width of the gap is aerodynamically selected to not affect the laminar flow of air across the top of the front energy absorber 220 and the rear energy absorber 225. For example, the gap may be between 5 millimeters (mm) and 10 mm wide. Were the gap wider, air would be re-directed to a space between the energy absorbers and could negatively impact the laminar flow of air into the engine compartment. As such, the arrangement of the front energy absorber 220 and the rear energy absorber 225 provide for increased airflow, notwithstanding the two-piece pedestrian safety structure of the energy absorption system 215.

FIG. 6 also depicts the rib 535 added to increase the stiffness of the front energy absorber 220. As depicted in FIG. 6, the rib 535 and the first top surface of the front energy absorber 220 form a notch. The front surface of the rear energy absorber 225 is separated from the first top surface by a vertical portion of the gap, while the bottom surface of the rear energy absorber 225 is separated from the rib 535 by a horizontal portion of the gap. As such, an upper portion of the front energy absorber overlaps a lower portion of the rear energy absorber in a vehicle length direction. The arrangement of the energy absorbers in this fashion provides the two-piece pedestrian safety characteristic and the laminar flow characteristic of the energy absorption system 215.

When simulated using a computational flow dynamic (CFD) model, the present energy absorption system 215 resulted in an increased airflow rate of approximately 17%. As such, more air is directed to and accessible by the vehicle's radiator. Moreover, the ribs 535 and the two-piece construction of the energy absorption system 215 provide enhanced pedestrian safety.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle energy absorption system, comprising:
 a front energy absorber with a first top surface having an angle; and
 a rear energy absorber with a second top surface that is curved, the rear energy absorber is separated from the front energy absorber by a gap and a plane of the first top surface is tangential to the second top surface.

2. The vehicle energy absorption system of claim 1, wherein the front energy absorber extends below and in front of the rear energy absorber in a vehicle length direction.

3. The vehicle energy absorption system of claim 1, further comprising a rib formed on a back surface of the front energy absorber, wherein the rib is transverse to a vehicle length direction.

4. The vehicle energy absorption system of claim 3, wherein:
 the rib and first top surface form a notch in the front energy absorber;
 a front surface of the rear energy absorber is separated from the first top surface by a vertical portion of the gap; and
 a bottom surface of the rear energy absorber is separated from the rib by a horizontal portion of the gap.

5. The vehicle energy absorption system of claim 1, wherein the front energy absorber further comprises:
 a vertical front surface; and
 a downward-sloping bottom surface such that the front energy absorber has a convex profile in a vehicle length direction.

6. The vehicle energy absorption system of claim 1, wherein the rear energy absorber and the front energy absorber are individually attachable to a frame of a vehicle.

7. The vehicle energy absorption system of claim 1, wherein the rear energy absorber is stiffer than the front energy absorber.

8. The vehicle energy absorption system of claim 1, wherein the rear energy absorber and the front energy absorber are formed of different materials.

9. The vehicle energy absorption system of claim 7, wherein:

the rear energy absorber is formed of a first foam having a first density; and the front energy absorber is formed of a second foam having a second density that is less than the first density.

10. The vehicle energy absorption system of claim 1, wherein an upper portion of the front energy absorber overlaps a lower portion of the rear energy absorber in a vehicle length direction.

* * * * *